Nov. 23, 1954 B. A. WEIDEMAN 2,694,995
STAND FOR ASSEMBLY OF BATTERY ELEMENTS
Filed Aug. 15, 1949 2 Sheets-Sheet 1
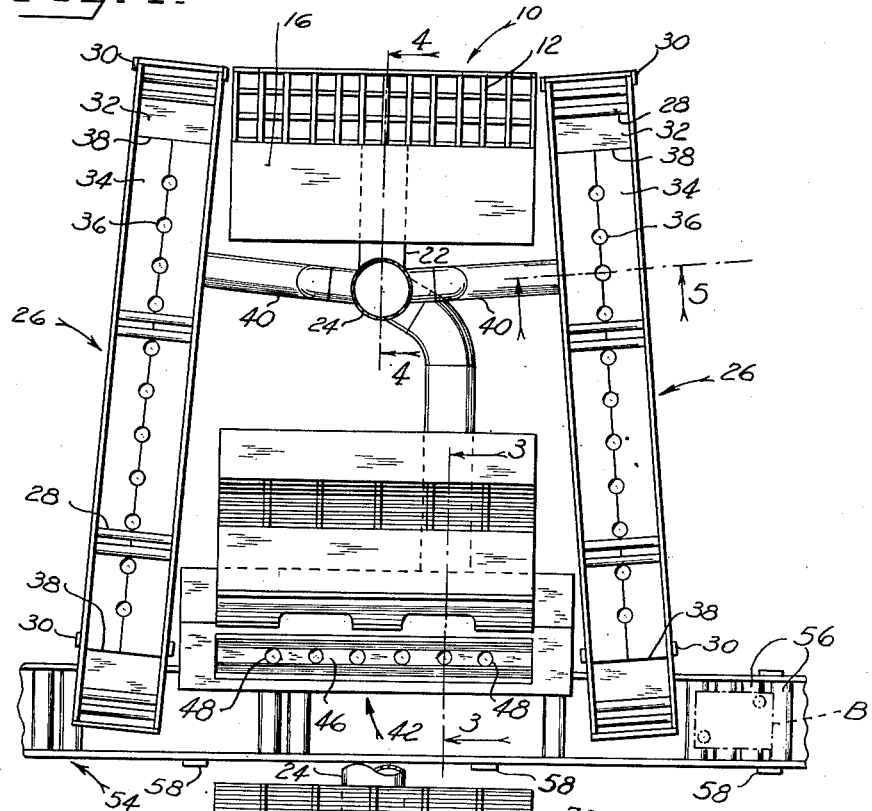
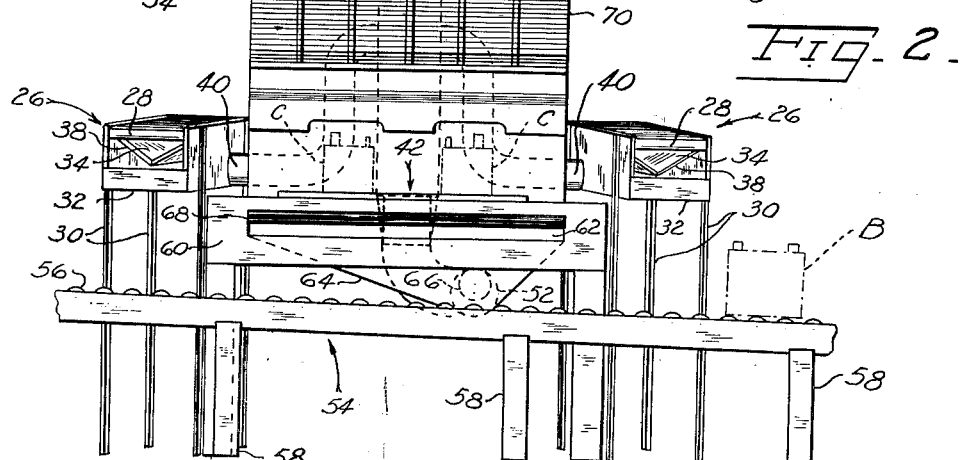
INVENTOR.
Bernard A. Weideman.
BY
John W. Michael
ATTORNEY Nov. 23, 1954  B. A. WEIDEMAN  2,694,995
STAND FOR ASSEMBLY OF BATTERY ELEMENTS
Filed Aug. 15, 1949  2 Sheets-Sheet 2
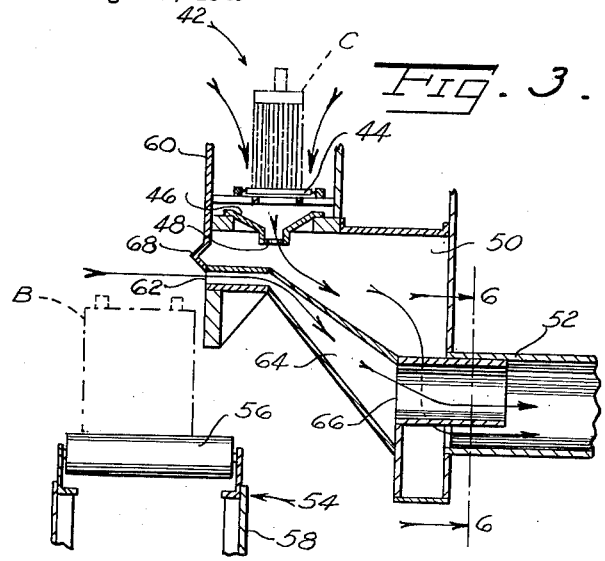
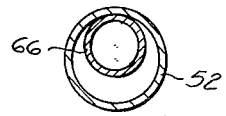
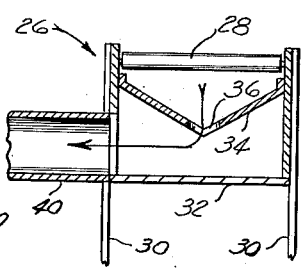
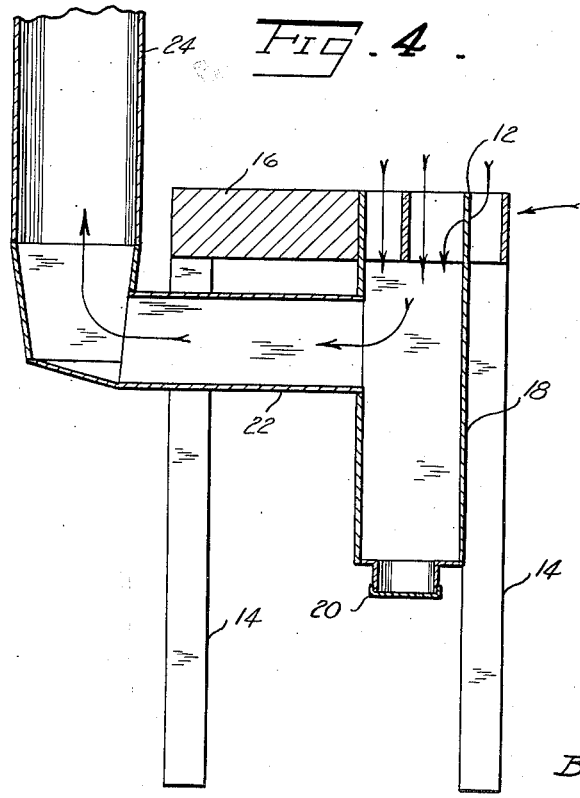
INVENTOR.
Bernard A. Weideman.
BY
John W. Michael
ATTORNEY United States Patent Office 2,694,995
Patented Nov. 23, 1954

2,694,995

STAND FOR ASSEMBLY OF BATTERY ELEMENTS

Bernard A. Weideman, Sussex, Wis., assignor to Globe-Union Inc., Milwaukee, Wis., a corporation of Delaware Application August 15, 1949, Serial No. 110,297

2 Claims. (Cl. 113—59)

This invention relates to improvements in stands for the assembly and insertion of battery elements.

Negative and positive plates or electrodes contain oxides which in the handling of the plates give off a highly toxic dust. It has always been a problem in the battery-making industry to control such dust so that it will not be harmful to the workers.

An object of this invention, therefore, is to provide a stand for the assembly of battery elements which prevents harmful concentration of lead oxide dust at the element-handling stations where workers are positioned.

Another object of this invention is to provide such a stand wherein battery elements are conveniently stacked into cell groups, transported to lead-burning stations, and assembled into battery containers.

These objects are obtained by providing a stand which has a stacking table where plates and separators are assembled in a cell group, a storage conveyer upon which cell groups are transferred to the lead-burning station, a lead-burning station in which cell groups are held while connecting straps are assembled and lead-burned, and a container conveyer in front of and on which containers are supported with the tops thereof below the lead-burning station. A centrally located air duct has branch ducts which lead to dust-collecting pans located below the stacking table, the storage conveyer, and cell group receptacles in the burning station. An auxiliary duct also leads to an elongated intake opening in the front wall of the burning station. This opening extends across the entire front of the cell group receptacles of the burning station and is slightly above the tops of containers carried on the container conveyer. Any suitable means is used to create a suction in the central duct whereby a volume of air is continually rapidly drawn: down through the latticed top of the stacking table and openings in the dust-collecting pan therebelow; down between the rollers of the storage conveyer, past openings at the ends of such conveyer, and down through openings in the false bottom of the dust-collecting pan therebelow; downwardly alongside the cell groups positioned in the receptacles of the burning station and down through openings in the dust-collecting pan therebelow; and across the tops of containers on the container conveyer and into the elongated opening. Thus in a single compact stand there is provided means for accomplishing the easy handling of the battery parts and for drawing off dust at every station where the plates or cell groups are handled. It is particularly advantageous to accomplish the insertion of the cell groups at the same place where they are lead-burned. Such insertion is hazardous. When the cell group is dropped into the container the air therein is displaced upwardly carrying a dangerous concentration of toxic dust into the breathing zone of the operator. However, the stream of air traveling rapidly across the top of the containers takes with it such dust-laden air and prevents toxic dust reaching such breathing zone.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a top plan view of a stand for the assembly of battery elements embodying the present invention;

Fig. 2 is a view in front elevation of the stand of Fig. 1;

Fig. 3 is a fragmentary enlarged sectional view taken on line 3—3 of Fig. 1;

Fig. 4 is a fragmentary enlarged sectional view taken on line 4—4 of Fig. 1;

Fig. 5 is a fragmentary enlarged sectional view taken on line 5—5 of Fig. 1; and Fig. 6 is a sectional view taken on line 6—6 of Fig. 3.

Referring to the drawings by reference numerals, the stand for the assembly of the battery elements consists of a stacking table 10 on which plates and separators are arranged in cell groups, a pair of storage conveyers 26 on which cell groups are stored, a burning station 42 to which such conveyers transfer cell groups, and a battery container conveyer 54 which supports containers in front of such burning station.

The table 10 has a top with a latticed portion 12 and a solid portion 16 and is suitably supported on legs 14. Below the latticed portion 12 and extending longitudinally thereof is a dust-collecting pan 18 having a clean-out sump 20. A branch duct 22 leads from the pan 18 to a central duct 24 so that when suction is applied to the central duct air will move downwardly through the latticed portion 12.

Starting at each end of the stacking table and extending therefrom to the front of the burning stand are a pair of identically constructed storage conveyers 26 pitched to allow gravity to cause cell groups placed on the rollers 28 to roll down to the front. Each conveyer is supported by legs 30 and has a dust-collecting pan consisting of a bottom member 32 extending from end to end of the pan and a V-shaped false bottom 34 having its ends 38 spaced from the ends of the pan to provide large openings immediately under the ends of the conveyers where operators handle the cell groups. The false bottom 34 has a plurality of spaced openings 36 therein and is positioned between the rollers 28 and the bottom 32. A branch duct 40 leads from an opening in the side of each storage conveyer between the bottom 32 and false bottom 34 to the central duct 24. When suction is applied to duct 40 the principal volume of air comes down through the rolls at each end of the storage conveyers. However, a smaller volume of air passes down through the rolls and the openings 36 to carry away any dust which accumulates as the cell groups roll along the conveyer. Thus the greatest volume of air moves down over the cell groups at the operator-breathing zones.

The burning station, indicated generally at 42, has two receptacles (not shown) for receiving cell groups preparatory to positioning connecting straps thereon and lead-burning such straps. Each receptacle is a part of a lead-burning apparatus described in the application for patent of Bernard A. Weideman, Serial No. 105,734, filed July 20, 1949, for "Method and Apparatus for Positioning Battery Plates for Lead-Burning," now Patent Number 2,628,992. Associated with the receptacles are semi-automatically operated multiple-tipped burning torches. When a cell group is placed in the receptacle and the connector straps assembled, the operator starts the operation and the straps are lead-burned. However, these parts are not shown nor do they form any part of this invention. As shown in Fig. 3, the cell group, designated by the letter C, rests on spaced members 44 in each cell group receptacle so that air can pass down past the cell group and through the bottom of each receptacle. Extending longitudinally of and below both receptacles is a dust-collecting pan 46 having longitudinally spaced openings 48 in the bottom thereof. These openings communicate with a distributing chamber 50 from which a branch duct 52 leads to the central duct 24. As suction is applied to duct 52 air will be drawn downwardly along the sides of the cell groups into the dust-collecting pan 46 and down through the openings 48 into the common chamber 50 and hence into the branch duct 52.

It is most convenient to confine the insertion of the cell groups into the battery container to a small area. This can be done if such groups are inserted at the time they are removed from the receptacles. In the accomplishment thereof a battery container conveyer, designated generally at 54, has its rollers 56 supported on legs 58 and pitched so that gravity will aid the movement of containers therealong. The conveyer is positioned so that containers, diagrammatically illustrated at B, moving therealong will pass in front of and below the burning station 42. Hence the operator need only lift the cell group C from the receptacle and drop it directly into an awaiting container. However, a considerable amount of air is ejected upwardly from the container as the cell group is dropped therein and this air would carry toxic dust from the plates of the cell group to the breathing zone of the operator. This is prevented, however, by continually drawing air across the tops of the containers which entraps and carries away such dust-retaining air. This is accomplished by placing in the front face 60 of the burning station an opening 62 which extends across such face slightly above the tops of battery containers on the conveyer 54 and connecting such opening by a distributing manifold 64 to a tube 66. The tube 66 has a smaller diameter than duct 52 and is positioned in the mouth thereof. Hence as suction is applied to duct 52 air will be drawn across the battery containers into the opening 62, through manifold 64 and tube 66 into branch duct 52. By proportioning the diameters of the tube 66 and branch duct 52 the volume of air drawn through the opening 62 may be desirably proportioned to that pulled down through the burning station receptacles. The face 60 may be provided with a projecting lip 68 extending along and above the opening 62. This lip has a funnelling effect and tends to concentrate the movement of air to the area above the battery containers B.

The burning station 42 may have positioned thereabove a connector strap shelf 70 having various compartments. There usually are three different cell groups to a battery and each group has a different pair of connector straps. For example, one cell group requires a plain connector strap and a positive terminal strap. Another cell group requires two plain connector straps. The third group requires a plain connector strap and a negative terminal strap. Hence, it is preferable to have six compartments to make three pairs. Each pair is supplied with the proper connecting straps for a corresponding cell group. The operator need only reach for the pair needed which he judges by their position.

Various state safety laws have minimums of velocity in feet per minute and volume in cubic feet per minute. By placing the opening 62 near the battery container and keeping its length confined to two adjacent cell group lead-burning receptacles, the velocity may be maintained well above such minimum requirements without unduly increasing the volume. Hence, overall efficiency is increased.

The cell groups as assembled are placed on the conveyer 26 and automatically stored thereon and delivered to the burning station. A supply of battery containers is constantly furnished on the container conveyer 54. The burning operator places a cell group in one of the receptacles, takes the desired pair of connecting straps from the shelf 70 and places them on the cell group, and starts the automatic lead-burning operation. While lead-burning is taking place the operator places another cell group in the other receptacle, puts on the proper connecting straps, and starts the other automatic burning operation. By this time the first cell group will have been lead-burned and the operator lifts such cell group from the receptacle and places it in a battery container. These cycles are continuously repeated.

Although only one embodiment of the invention is shown and described herein, it will be understood that this application is intended to cover such changes or modifications as come within the spirit of the invention or scope of the following claims.

I claim:

1. In a stand for assembling battery elements including a front face and a top, a lead-burning station in said top having a plurality of receptacles for holding cell groups while being lead-burned, said receptacles having open-work bottoms, a dust-collecting pan below said receptacles, a battery container support positioned adjacent said face whereby cell groups may be removed from said receptacles and placed in containers on said support, an air intake opening in said front face having a length greater than the combined length of said receptacles and positioned adjacent said support above the tops of battery containers when positioned on said support, said opening being below said pan, a distributing chamber connected with said pan, said front face forming one wall of said chamber, a suction duct leading from said chamber, and a smaller duct positioned within said suction duct and connected at its outer end with said intake opening, whereby with a source of suction applied to said suction duct air may be drawn downwardly through said receptacles into the pan, said chamber, and suction duct while air is being simultaneously drawn over the tops of battery containers on said support and into said intake opening, said smaller duct, and said suction duct.

2. In a stand for the assembly and lead-burning of battery elements having a top, a lead-burning station in said top and having a front face, a dust-collecting pan below said station having spaced openings in the bottom thereof, a chamber below said pan connected with said openings, said front face forming one wall of said chamber, a stand for battery containers positioned in front of said burning station and adjacent said front face so that cell groups may be lowered from said burning station into containers on said stand, a slot in said front face extending longitudinally thereof, said slot being spaced with respect to said stand so that it will be slightly above the tops of battery containers on said stand, said slot being below said pan, a manifold leading from said slot, and a common suction duct for said chamber and manifold.

References Cited in the file of this patent

UNITED STATES PATENTS

| Number | Name | Date |
|---|---|---|
| 703,897 | Cooksey | July 1, 1902 |
| 1,019,030 | Eick | Mar. 5, 1912 |
| 1,389,155 | Norris | Aug. 30, 1921 |
| 1,451,538 | Engel | Apr. 10, 1923 |
| 1,934,808 | Liptay | Nov. 14, 1933 |
| 1,936,527 | Shellcrosslee | Nov. 21, 1933 |
| 2,341,628 | Koweindl | Feb. 15, 1944 |
| 2,358,868 | Marx | Sept. 26, 1944 |
| 2,361,861 | Masowich | Oct. 31, 1944 |
| 2,422,330 | Allerdice | June 17, 1947 |
| 2,457,263 | Norquist | Dec. 28, 1948 |
| 2,539,344 | Carraway | Jan. 23, 1951 |
| 2,593,089 | Barry | Apr. 15, 1952 |